US 11,208,034 B2

(12) United States Patent
Salter et al.

(10) Patent No.: US 11,208,034 B2
(45) Date of Patent: Dec. 28, 2021

(54) VEHICLE LAMP ASSEMBLY

(71) Applicant: Ford Global Technologies, LLC, Dearborn, MI (US)

(72) Inventors: Stuart C. Salter, White Lake, MI (US); Paul Kenneth Dellock, Northville, MI (US); Mehran Niksimaee, Orchard Lake Village, MI (US); Linsheng Chen, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 370 days.

(21) Appl. No.: 15/899,871

(22) Filed: Feb. 20, 2018

(65) Prior Publication Data
US 2019/0255990 A1 Aug. 22, 2019

(51) Int. Cl.
| *B60Q 1/50* | (2006.01) |
| *B60Q 1/26* | (2006.01) |
| *B60Q 1/30* | (2006.01) |
| *F21S 43/27* | (2018.01) |
| *F21S 43/20* | (2018.01) |
| *F21S 43/14* | (2018.01) |
| *F21S 43/13* | (2018.01) |
| *F21S 43/19* | (2018.01) |
| *F02B 37/18* | (2006.01) |

(Continued)

(52) U.S. Cl.
CPC ............ *B60Q 1/50* (2013.01); *B60Q 1/2607* (2013.01); *B60Q 1/2619* (2013.01); *B60Q 1/2623* (2013.01); *B60Q 1/30* (2013.01); *B60Q 1/302* (2013.01); *F21S 43/13* (2018.01); *F21S 43/14* (2018.01); *F21S 43/19* (2018.01); *F21S 43/26* (2018.01); *F21S 43/27* (2018.01); *B60Q 2400/50* (2013.01); *F02B 37/18* (2013.01); *F02D 37/02* (2013.01); *F02D 41/064* (2013.01); *F21W 2104/00* (2018.01)

(58) Field of Classification Search
CPC ............................. B60Q 2400/50; B60Q 1/50
See application file for complete search history.

(56) References Cited

U.S. PATENT DOCUMENTS 5,856,793 A 1/1999 Tonkin et al.
5,963,345 A * 10/1999 Smith .................. B60Q 1/50
359/1
(Continued)

FOREIGN PATENT DOCUMENTS

| DE | 102014106978 A1 | 11/2015 |
| JP | 5221462 | 6/2013 |
| WO | 2008132773 A1 | 11/2008 |

OTHER PUBLICATIONS

Off the Hook Auto Accessories web page print relating to Roush Mustang dated Mar. 18, 2015.
(Continued)

*Primary Examiner* — Andrew J Coughlin
(74) *Attorney, Agent, or Firm* — David Coppiellie; Price Heneveld LLP

(57) ABSTRACT

A lamp assembly is provided herein. The lamp assembly includes a panel operably coupled with one or more projectors. A light source is disposed within each of the one or more projectors. An optical member is disposed between each of the light sources and the panel. An image interference is disposed between the optical member and an exterior surface of the panel.

17 Claims, 9 Drawing Sheets

(51) Int. Cl.
*F02D 37/02* (2006.01)
*F02D 41/06* (2006.01)
*F21W 104/00* (2018.01)

(56) References Cited

U.S. PATENT DOCUMENTS

| | | | |
|---|---|---|---|
| 7,375,621 B1 * | 5/2008 | Hines | B60Q 9/005 |
| | | | 340/435 |
| 7,575,349 B2 * | 8/2009 | Bucher | B60Q 1/302 |
| | | | 362/231 |
| 9,321,395 B2 | 4/2016 | Ammar et al. | |
| 9,688,188 B2 * | 6/2017 | Son | B60Q 1/50 |
| 10,040,392 B2 | 8/2018 | Salter et al. | |
| 2008/0309477 A1 | 12/2008 | Dakov | |
| 2017/0190283 A1 | 7/2017 | Ding | |

OTHER PUBLICATIONS

Tesla Motors Club web page print relating to Lighted Rear Applique Special Effects dated Dec. 27, 2015.

* cited by examiner

VEHICLE LAMP ASSEMBLY

FIELD OF THE INVENTION

The present disclosure generally relates to a lamp assembly, and more particularly, to a lamp assembly on a vehicle.

BACKGROUND OF THE INVENTION

Lamp assemblies are employed in vehicles to provide various functions. For some vehicles, it may be desirable to have a lamp assembly that notifies persons proximate the vehicle when a feature of the vehicle is activated.

SUMMARY OF THE INVENTION

According to one aspect of the present disclosure, a lamp assembly is provided herein. The lamp assembly includes a panel operably coupled with one or more projectors. A light source is disposed within each of the one or more projectors. An optical member is disposed between each of the light sources and the panel. An image interference is disposed between the optical member and an exterior surface of the panel.

According to another aspect of the present disclosure, a vehicle lamp assembly is provided herein. The vehicle lamp assembly includes a light source disposed within one or more projectors. An optical member is disposed between each of the light sources and a panel. An image interference is disposed on a holographic film and disposed between the optical member and an exterior surface of the panel.

According to yet another aspect of the present disclosure, a vehicle lamp assembly is provided herein. The vehicle lamp assembly includes a light source disposed within one or more projectors. An optical member is disposed between each of the light sources and a panel. A plurality of image interferences is disposed on a holographic film and disposed between each of the optical members and an exterior surface of the panel. A controller sequentially activates the one or more projectors to generate an animated lighted image.

These and other aspects, objects, and features of the present invention will be understood and appreciated by those skilled in the art upon studying the following specification, claims, and appended drawings.

DETAILED DESCRIPTION OF THE PREFERRED EXAMPLES

Figure 1:
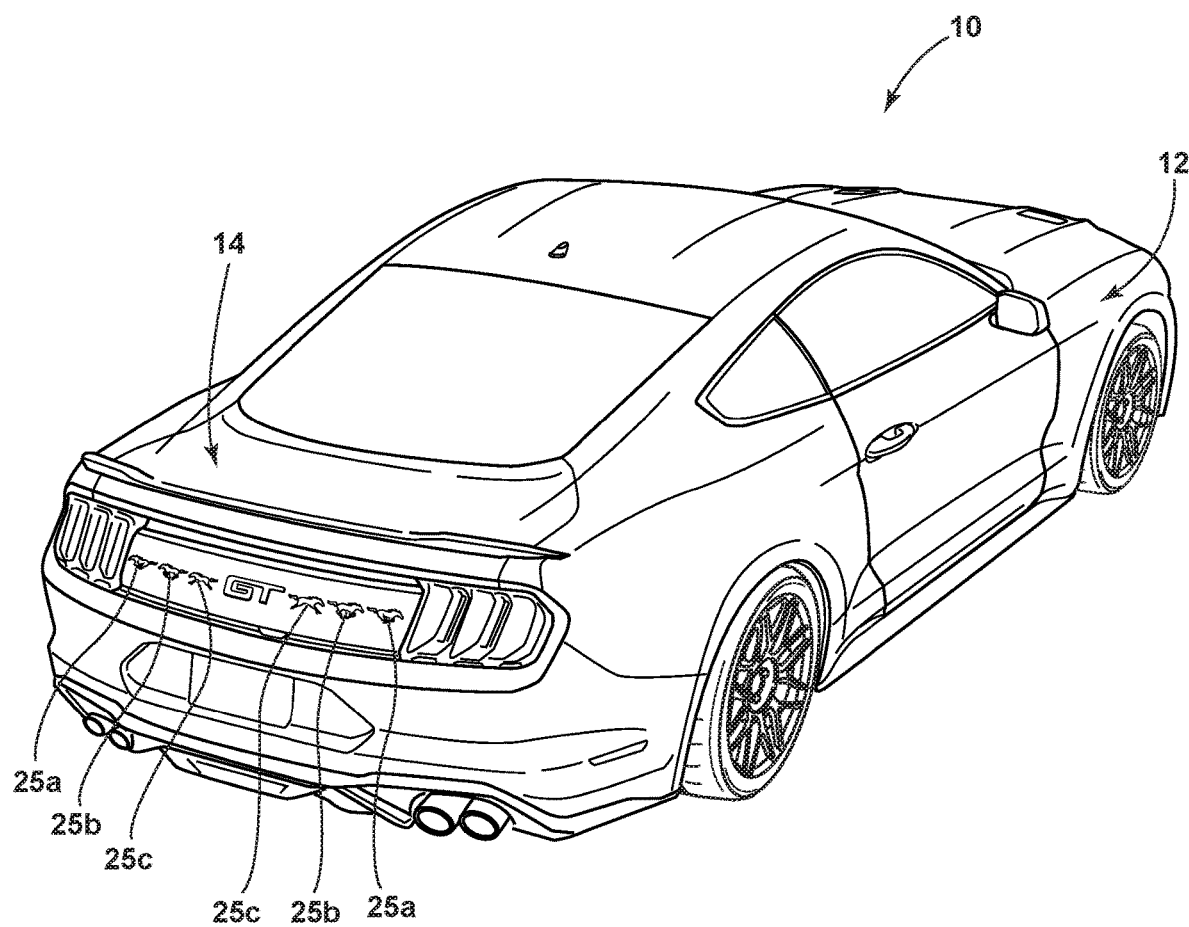
FIG. 1 is a rear perspective view of a vehicle having a lamp assembly operably coupled with an exterior panel generating various images, according to some examples.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary examples of the inventive concepts defined in the appended claims. Hence, specific dimensions and other physical characteristics relating to the examples disclosed herein are not to be considered as limiting, unless the claims expressly state otherwise.

As required, detailed examples of the present invention are disclosed herein. However, it is to be understood that the disclosed examples are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a lamp assembly that may be disposed on a vehicle. In some examples, the lamp assembly may be operably coupled with an external panel of the vehicle. Moreover, the lamp assembly may be optically coupled with an interference that is illuminated by the lamp assembly to create an image. In some instances, the image notifies persons proximate the vehicle when a feature of the vehicle is activated.

Figure 2:
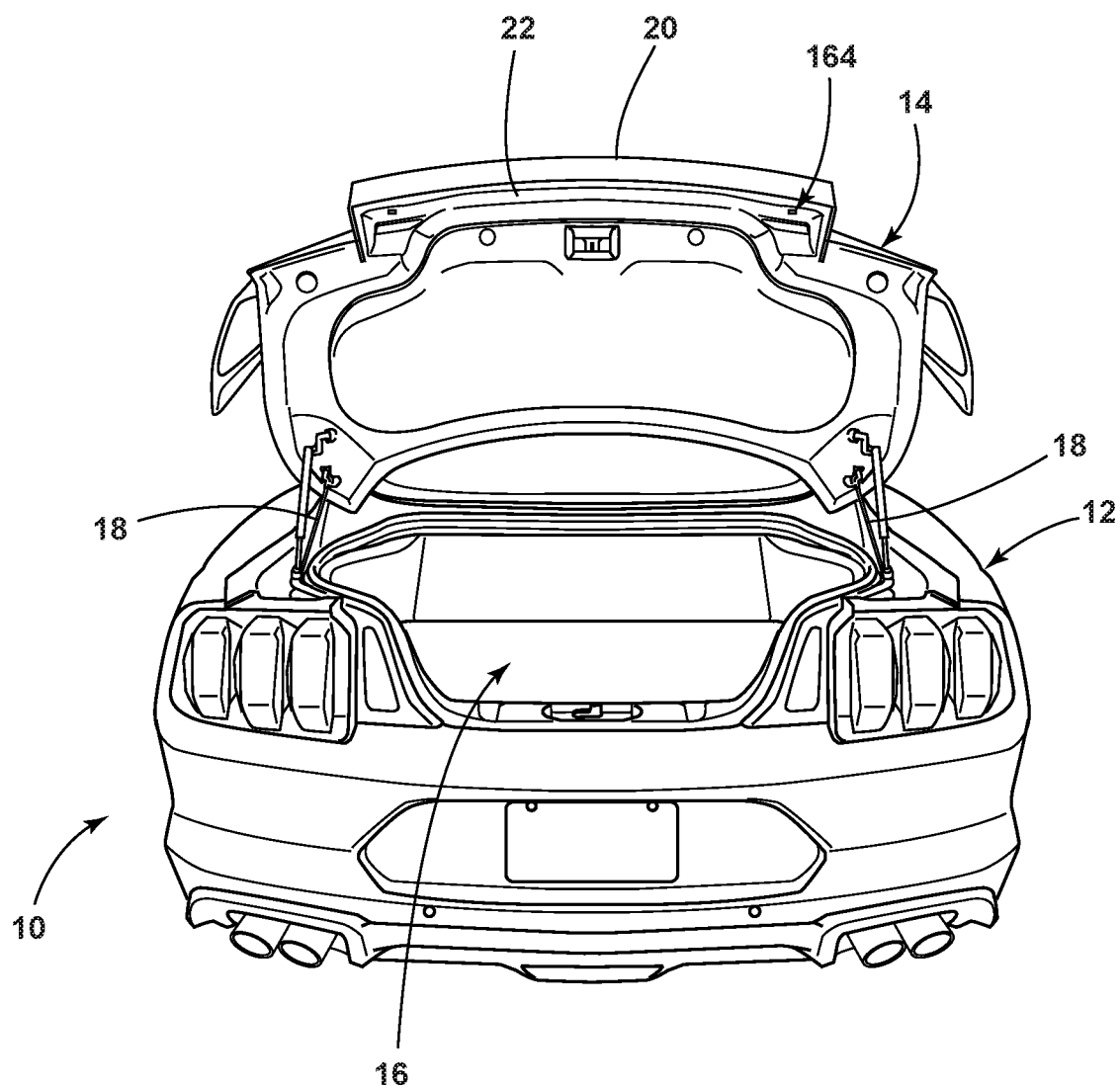
FIG. 2 is a rear perspective view of the vehicle having a decklid disposed in an open position, according to some examples.

Referring to FIGS. 1 and 2, a vehicle 10 includes a body 12 and a decklid assembly 14 pivotably attached to the body 12. The body 12 may define a trunk compartment 16 therein and the decklid assembly 14 is configured for transitioning between a closed position (illustrated generally in FIG. 1) wherein the decklid assembly 14 covers the trunk compartment 16 and sealingly abuts the body 12, and an open position (illustrated generally in FIG. 2) wherein the decklid assembly 14 provides access to the trunk compartment 16. The decklid assembly 14 may be pivotably attached to the body 12 in any suitable manner. For example, as best shown in FIG. 2, the decklid assembly 14 may be pivotably attached to the body 12 by a plurality of hinges 18 or arms. As used herein, the terminology trunk compartment 16 refers to a cavity or compartment in which luggage, a spare tire, and other articles such as packages, groceries, and the like may be stored. As such, it is to be appreciated that, although shown disposed at the rear of the vehicle 10 in FIGS. 1 and 2, the trunk compartment 16 may alternatively be disposed at any other position about the vehicle 10.

Referring further to FIGS. 1 and 2, the decklid assembly 14 includes a first panel 20 and a second panel 22 spaced apart from the first panel 20 to define a void therebetween. For example, the first panel 20 may be a trim panel and the second panel 22 may be a structural panel or a body panel. The first panel 20 may be disposed generally along the second panel 22 to define the void therebetween. The void may be configured for housing, for example, a lamp assembly 24 (FIG. 7), wiring, insulating materials, and/or other components of the vehicle 10.

The lamp assembly 24 may be disposed within the void and may be operably coupled to the first and/or second panel 20, 22. When illuminated, the lamp assemblies may produce light that is visible from an exterior side of the first panel 20. In some examples, the lamp assemblies are illuminated in response to initiation of a vehicle feature, such as an operational mode of a vehicle engine. However, it will be appreciated that the lamp assemblies may illuminate for any desired reason without departing from the scope of the present disclosure. The illumination may produce one or more images 25a, 25b, 25c.

Figure 3:
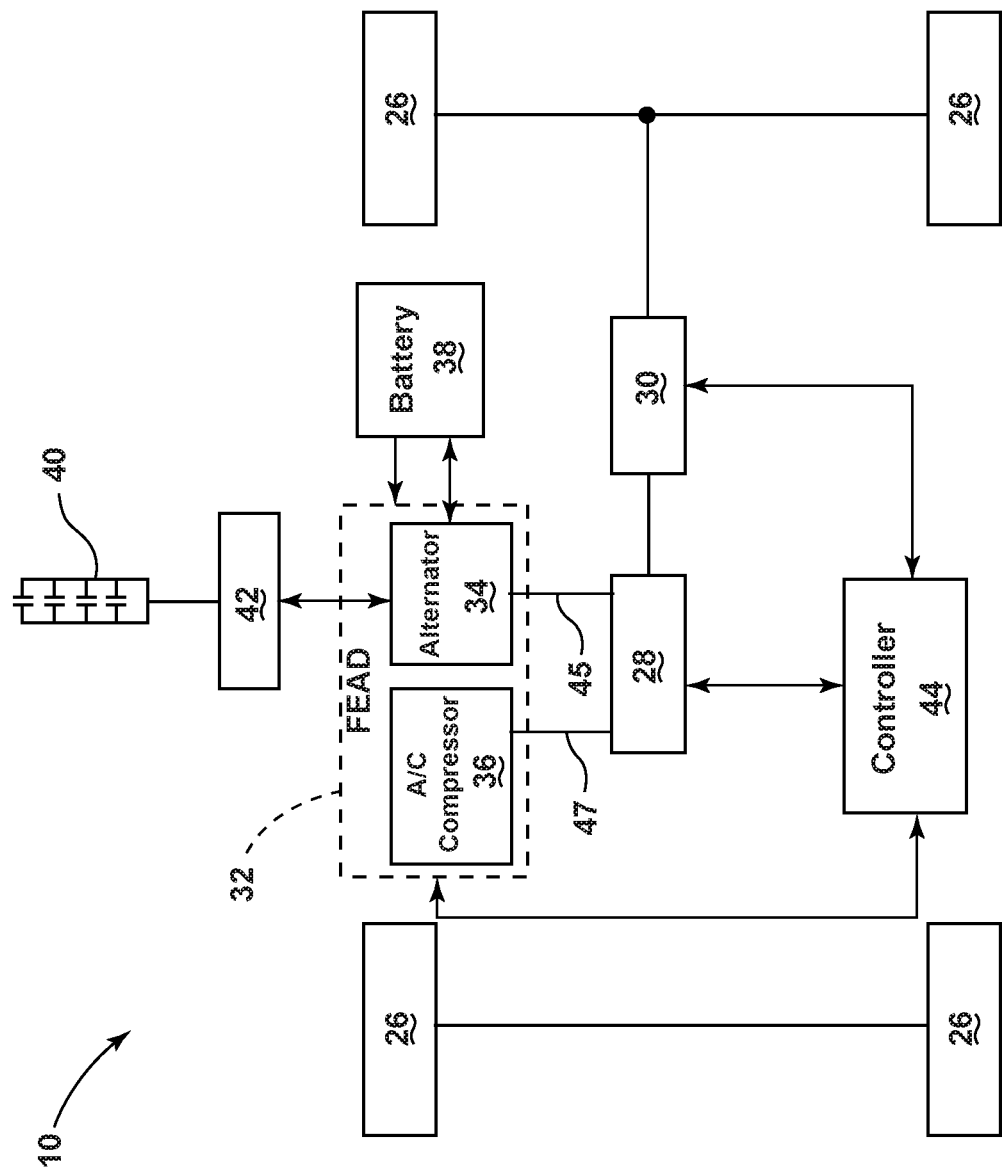
FIG. 3 is a schematic diagram of the vehicle, according to some examples.

Referring to FIG. 3, the vehicle 10 includes wheels 26. Torque may be supplied to wheels 26 via an engine 28 and a transmission 30. In some examples, an electric motor or hydraulic motor may also provide torque to wheels 26. A front-end accessory drive (FEAD) 32 includes an alternator 34 and an air conditioning (A/C) compressor 36. The alternator 34 and the A/C compressor 36 may each be mechanically coupled to the engine 28 via a shaft or pulley, or may be mechanically coupled to the engine 28 via a common shaft or pulley. A battery 38 and the alternator 34 may provide electrical power to various engine accessory components. The alternator 34 may be coupled to a capacitor bank 40 via an electronic interface 42 in order to store excess charge built up during various operating modes of the engine 28. The capacitor bank 40 may include one or more capacitors arranged in parallel that receive and discharge charge from the alternator 34. In other examples, the capacitor bank 40 may include one or more capacitors arranged in series. The capacitor bank 40 may receive charge from the alternator 34 in parallel, and discharge the charge in series. In some examples, the capacitor bank 40 may charge and discharge voltage at a fixed voltage, such as 6, 12, or 24 volts, but in other examples may be configured to charge and discharge at fixed or variable voltages other than 6, 12, or 24 volts.

Figure 4:
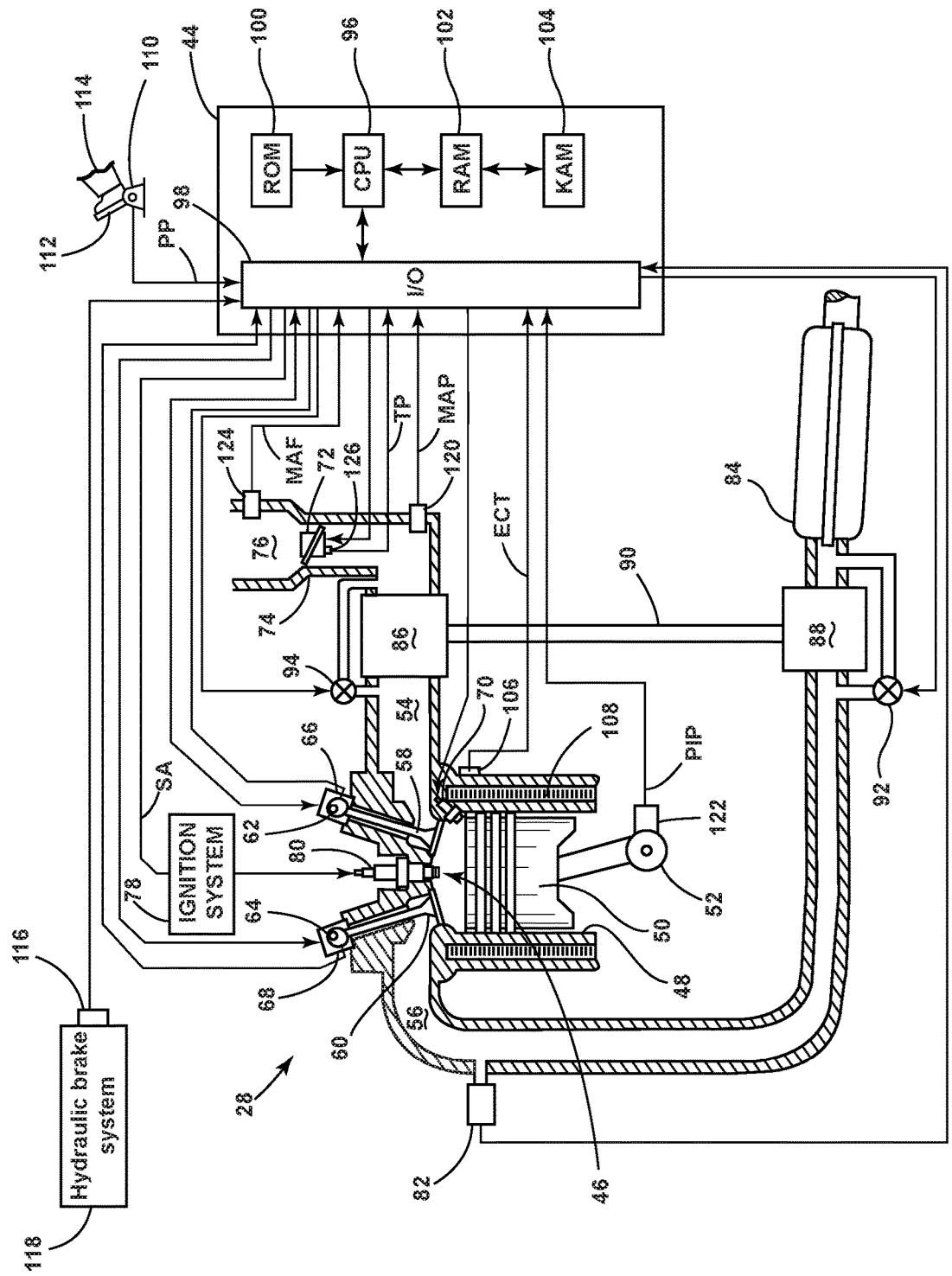
FIG. 4 is a schematic diagram of an engine, according to some examples.

Referring to FIGS. 3 and 4, the internal combustion engine 28 includes a plurality of cylinders, one cylinder of which is shown in FIG. 4, is controlled by an electronic engine controller 44. The engine 28 includes a combustion chamber 46 and cylinder walls 48 with a piston 50 positioned therein and connected to a crankshaft 52. The combustion chamber 46 is shown communicating with an intake manifold 54 and an exhaust manifold 56 via an intake valve 58 and an exhaust valve 60, respectively. Each intake and exhaust valve 58, 60 may be operated by an intake cam 62 and an exhaust cam 64. Alternatively, one or more of the intake and exhaust valves 58, 60 may be operated by an electromechanically controlled valve coil and armature assembly. The position of the intake cam 62 may be determined by an intake cam sensor 66. The position of the exhaust cam 64 may be determined by an exhaust cam sensor 68.

A fuel injector 70 is shown positioned to inject fuel into the cylinder, which is known to those skilled in the art as direct injection. Alternatively, fuel may be injected to an intake port, which is known to those skilled in the art as port injection. The fuel injector 70 delivers liquid fuel in proportion to the pulse width of a signal from the engine controller 44. Fuel is delivered to fuel injector 70 by a fuel system (not shown) including a fuel tank, fuel pump, and fuel rail (not shown). In addition, the intake manifold 54 is shown communicating with an optional electronic throttle 72, which adjusts a position of a throttle plate 74 to control airflow from an air intake 76 to the intake manifold 54. In some examples, a low-pressure direct injection system may be used, where fuel pressure can be raised to approximately 20-30 bar. Alternatively, a high-pressure, dual stage, fuel system may be used to generate higher fuel pressures.

A distributorless ignition system 78 provides an ignition spark to combustion chamber 46 via a spark plug 80 in response to the engine controller 44. A Universal Exhaust Gas Oxygen (UEGO) sensor 82 is shown coupled to an exhaust manifold 56 upstream of a catalytic converter 84. Alternatively, a two-state exhaust gas oxygen sensor may be substituted for the UEGO sensor 82.

The engine 28 may further include a compression device such as a turbocharger or supercharger including at least a compressor 86 arranged upstream of the intake manifold 54. For a turbocharger, the compressor 86 may be at least partially driven by a turbine 88 (e.g., via a shaft 90) arranged along the exhaust passage. For a supercharger, the compressor 86 may be at least partially driven by the engine 28 and/or an electric machine, and may not include a turbine. Thus, the amount of compression provided to one or more cylinders of the engine 28 via a turbocharger or supercharger may be varied by engine controller 44 and further by adjusting one or more of a wastegate 92 and/or a compressor bypass valve 94. A charge air cooler (not shown) may be included downstream from the compressor 86 and upstream of the intake valve 58. The charge air cooler may be configured to cool gases that have been heated by compression via the compressor 86, for example.

The converter 84 can include multiple catalyst bricks, in some examples. In other examples, multiple emission control devices, each with multiple bricks, can be used. In some instances, the converter 84 can be a three-way type catalyst.

The engine controller 44 is shown in FIG. 4 as a conventional microcomputer including a microprocessor unit 96, input/output ports 98, read-only memory 100, random access memory 102, keep alive memory 104, and a conventional data bus. The engine controller 44 is shown receiving various signals from sensors coupled to the engine 28, in addition to those signals previously discussed, including engine coolant temperature (ECT) from a temperature sensor 106 coupled to a cooling sleeve 108; a position sensor 110 coupled to an accelerator pedal 112 for sensing force applied by a foot 114 of a user, or any other sensor for determining an accelerator command for manual and/or autonomous operation of the vehicle 10; a hydraulic brake pressure signal from a sensor 116 coupled to the hydraulic brake system 118; a measurement of engine manifold pressure (MAP) from a pressure sensor 120 coupled to the intake manifold 54; an engine position sensor from a Hall effect sensor 122 sensing the crankshaft position; a measurement of air mass entering the engine from a sensor 124; and a measurement of throttle position from a sensor 126. Barometric pressure may also be sensed (sensor not shown) for processing by the engine controller 44. In some examples, the engine position sensor 122 produces a predetermined number of equally spaced pulses every revolution of the crankshaft 52 from which engine speed (RPM) can be determined.

In some examples, the engine 28 may be coupled to an electric motor/battery system in a hybrid vehicle 10. The hybrid vehicle 10 may have a parallel configuration, series configuration, or variations or combinations thereof. Further, in some examples, other engine configurations may be employed, for example, a diesel engine.

During operation, each cylinder within the engine 28 may undergo a four-stroke cycle: the cycle includes the intake stroke, compression stroke, expansion stroke, and exhaust stroke. During the intake stroke, generally, the exhaust valve 60 closes and the intake valve 58 opens. Air is introduced into the combustion chamber 46 via the intake manifold 54, and the piston 50 moves to the bottom of the cylinder to increase the volume within the combustion chamber 46. The position at which the piston 50 is near the bottom of the cylinder and at the end of its stroke (e.g. when the combustion chamber 46 is at its largest volume) is typically referred to by those of skill in the art as bottom dead center (BDC). During the compression stroke, the intake valve 58 and the exhaust valve 60 are closed. The piston 50 moves toward the cylinder head to compress the air within the combustion chamber 46. The point at which the piston 50 is at the end of its stroke and closest to the cylinder head (e.g. when the combustion chamber 46 is at its smallest volume) may be referred to by those of skill in the art as top dead center (TDC). In a process hereinafter referred to as injection, fuel is introduced into the combustion chamber 46. In a process hereinafter referred to as ignition, the injected fuel is ignited by known ignition means such as the spark plug 80, resulting in combustion. During the expansion stroke, the expanding gases push the piston 50 back to BDC. The crankshaft 52 converts piston movement into a rotational torque of the rotary shaft. Finally, during the exhaust stroke, the exhaust valve 60 opens to release the combusted air-fuel mixture to the exhaust manifold 56 and the piston 50 returns to TDC. Note that the above is shown merely as an example and that intake and exhaust valve opening and/or closing timings may vary, such as to provide positive or negative valve overlap, late intake valve closing, or various other examples.

Figure 5:
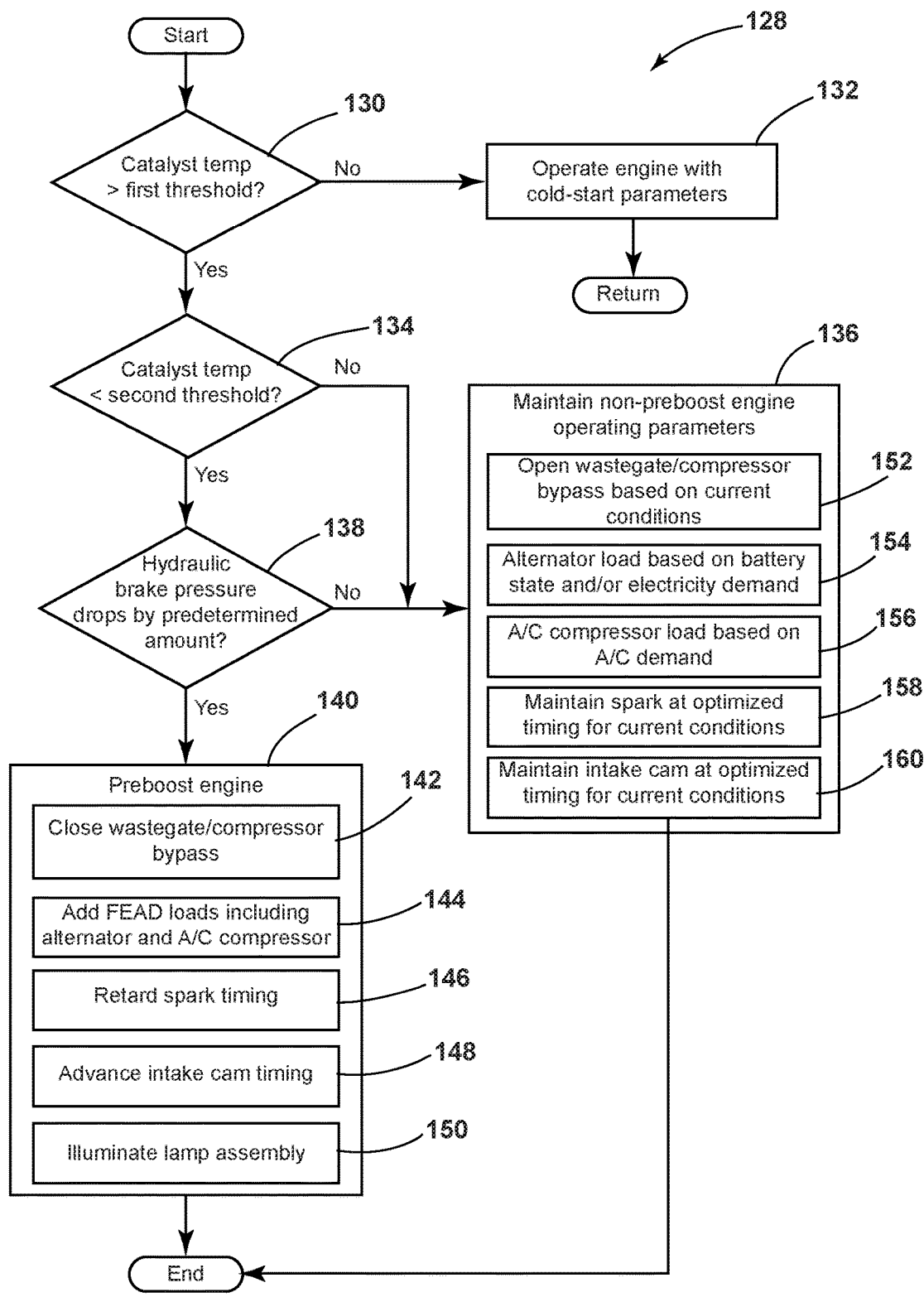
FIG. 5 is a flowchart illustrating an example method for pre-boosting the engine.

With reference to FIG. 5, a method 128 for pre-boosting an engine 28 according to some examples may be carried out by the engine controller 44 (FIG. 4) in response to signals received from various sensors, such as the hydraulic brake pressure sensor 116 (FIG. 4). Method 128 includes, at step 130, determining if a catalyst temperature is above a first threshold. The first catalyst temperature threshold may be any suitable temperature below which the catalyst may not be active. If the catalyst temperature is below the first threshold, the engine 28 may be operating under cold start conditions and thus may operate with cold start parameters at step 132. Cold start operating parameters may include directing exhaust output to the catalyst in order to heat the catalyst, and may include adjusting intake cam timing to the volumetric efficiency position, retarding spark timing, operating at rich air-fuel ratios, etc.

If the catalyst temperature is above the first threshold, method 128 proceeds to step 134 to determine if catalyst temperature is below a second threshold. The second catalyst temperature threshold may be any suitable temperature above which the catalyst may experience reduced activity and/or damage. If the catalyst temperature is not below the second threshold, method 128 proceeds to step 136 to maintain non-pre boost operating parameters. As a pre-boost condition may increase catalyst temperature, if the catalyst temperature is already relatively high, the catalyst may experience damage during the pre-boost, and thus the engine 28 may refrain from being pre-boosted when the catalyst temperature is above the threshold.

If catalyst temperature is below the second threshold, method 128 proceeds to step 138 to determine if hydraulic brake pressure has dropped by a threshold amount. For example, when a vehicle operator releases the brake pedal, the hydraulic brake pressure will drop. Detecting change in hydraulic brake pressure rather than a change in brake pedal position enables a more rapid detection of a change in brake status. The drop in pressure threshold amount may be any suitable amount that indicates the operator intends to release the brake pedal. In some examples, the threshold amount may be a drop of 50%, or it may be a drop of any other suitable amount over a particular time period.

If it is determined at step 138 that hydraulic brake pressure has dropped by a threshold amount, method 128 proceeds to step 140 to enable a pre-boost operation. The drop in hydraulic brake pressure may indicate the operator has released the brake pedal in order to accelerate and enable vehicle movement. In turbocharged engines, acceleration following idle conditions (such as when the vehicle 10 starts to move following a stop at a stoplight) can result in an acceleration lag due to the lack of exhaust output to spin the turbine 88 (FIG. 4) of the turbocharger. The pre-boost is enabled following brake pedal release in order to generate extra exhaust output to spin the turbine 88 and increase acceleration torque for a subsequent vehicle launch. In order to generate increased turbine spinning, airflow through the engine 28 may be increased. Thus, more exhaust flow will occur, and the turbine 88 can spin with increased speed, driving the compressor 86 to compress the increased airflow into the engine 28. However, as the pre-boost is performed in response to an operator releasing the brake pedal and before the engine 28 is launched, inadvertent acceleration as a result of the increased airflow may occur. To avoid this, a number of operations may be performed during the pre-boost mode to control engine speed. Thus, the pre-boost includes a variety of actions to increase boost while controlling engine speed. Further, the pre-boost includes actions to optimize a subsequent vehicle launch.

Enabling the pre-boost includes closing a wastegate 92 and compressor bypass valve (CBV) 94 at step 142. When open, the wastegate 92 allows exhaust to bypass the turbine 88, and the CBV 94 allows intake air to bypass the compressor 86. Both the wastegate 92 and CBV 94 can be controlled to modulate the amount of boost provided to the engine 28. By closing the wastegate 92, more exhaust will be funneled to the turbine 88 to maximize turbine output. Further, by closing the CBV 94, throttle inlet pressure can be increased. The wastegate 92 may have a set point based on engine speed and load, for example. During the pre-boost, this set point may be adjusted to increase boost pressure. Under some conditions, the wastegate 92 and/or CBV 94 may be fully closed, while under other conditions, the wastegate 92 and/or CBV 94 may be left partially open to direct most of the exhaust power to the turbocharger while allowing some exhaust and/or intake air to bypass the turbocharger.

The increased load may be placed on one or more front-end accessory drive (FEAD) components 32 at step 144. By increasing the load to the FEAD 32, engine speed can be controlled. For example, the A/C compressor 36 may be operated such that compressor head pressure is at a maximum safe pressure. Additionally, the alternator 34 may be operated at increased load by increasing the alternator charging voltage, for example by adjusting the alternator field. In some examples, the alternator load may be increased to maximum alternator load. In other examples, the degree of increase in the alternator load may be adjusted based on various conditions, such as the exhaust gas temperature, the boost level before increasing the alternator load, and others. For example, if the boost level before increasing the alternator load is at or above atmospheric pressure, less alternator load may be added. Further, as the load placed on the alternator 34 may be limited by the charging capacity of the battery 38 and/or electric power demand of the vehicle accessories, an extra charge storage apparatus may be coupled to the alternator 34 to handle the extra load. For example, one or more capacitors may be coupled to the alternator 34 to store extra charge generated during the pre-boost operation. In other examples, one or more additional batteries may be coupled to the alternator 34.

Enabling the pre-boost also includes retarding spark timing at step 146 and advancing intake cam timing at step 148. By retarding spark timing, power generated during combustion may be limited so that excess torque and engine speed can be avoided. Additionally, intake cam timing may be advanced to the best volumetric efficiency position during the pre-boost. Because there may be a lag associated with advancing cam timing, advancing during the pre-boost may enable the cam timing to be in the optimal position during a subsequent vehicle launch.

In some examples, when pre-boost is activated, the lamp assembly 24 (FIG. 7) on the vehicle 10 may be illuminated at step 150. The illumination may be disposed on an external surface of the vehicle 10 and provide notification to persons proximate the vehicle 10 of the pre-boost condition. However, it will be appreciated that the lamp assembly 24 may be illuminated in conjunction with the initiation of any other vehicle system and/or feature without departing the scope of the present disclosure.

If it is determined at step 138 that hydraulic brake pressure has not dropped by a threshold amount, for example, if the vehicle 10 is still stopped, or if it is moving without the operator using the brake pedal, method 128 proceeds to step 136 to maintain non-pre-boost engine operating parameters. Non-pre-boost operating parameters include opening the wastegate 92 and CBV 94 in response to exhaust pressure at step 152. Unlike in the pre-boost mode, the non-pre-boost conditions include allowing the wastegate 92 and CBV 94 to open, dependent upon engine speed and load, exhaust pressure etc., so that air movement through the turbocharger can be controlled to avoid excess boost that can damage engine components.

The non-pre-boost operating parameters also include loading the alternator 34 based on battery charge state and/or accessory component demand at step 154. As the alternator 34 converts engine mechanical energy into electrical energy for storage in the battery 38, the load on the alternator 34 may be based on the current charge state of the battery 38, and thus may be higher if the battery 38 is low on charge or may be lower if the battery 38 is fully charged. Further, the alternator 34 provides electricity to certain vehicle accessories such as a radio when the charge from the battery 38 is not enough to operate them, and so the alternator load may also be based on accessory demand. Similarly, the A/C compressor load may be based on A/C demand at step 156.

Non-pre-boost operating parameters include maintaining spark at optimized timing for the current operating conditions at step 158. In some examples, this may include maintaining spark timing at maximum brake torque (MBT). Likewise, at step 160, the non-pre-boost operating parameters include maintaining intake cam timing at the optimized timing for the current operating conditions, which in some examples may not include the best volumetric efficiency position.

Thus, method 128 provides for determining if the vehicle 10 may be pre-boosted and if so, carrying out various actions that enable extra engine boost while limiting engine speed. In some circumstances, following the pre-boost, the vehicle 10 will start to launch whereby an operator of the vehicle 10 will accelerate to launch the vehicle 10. In such instances, the lamp assembly 24 may activate to provide notification to proximate persons of the vehicle 10 of the vehicle feature. It will be appreciated, however, that the lamp assembly 24 may be illuminated in conjunction with any vehicle feature and/or for any other desired purpose without departing from the scope of the present disclosure.

Figure 6:
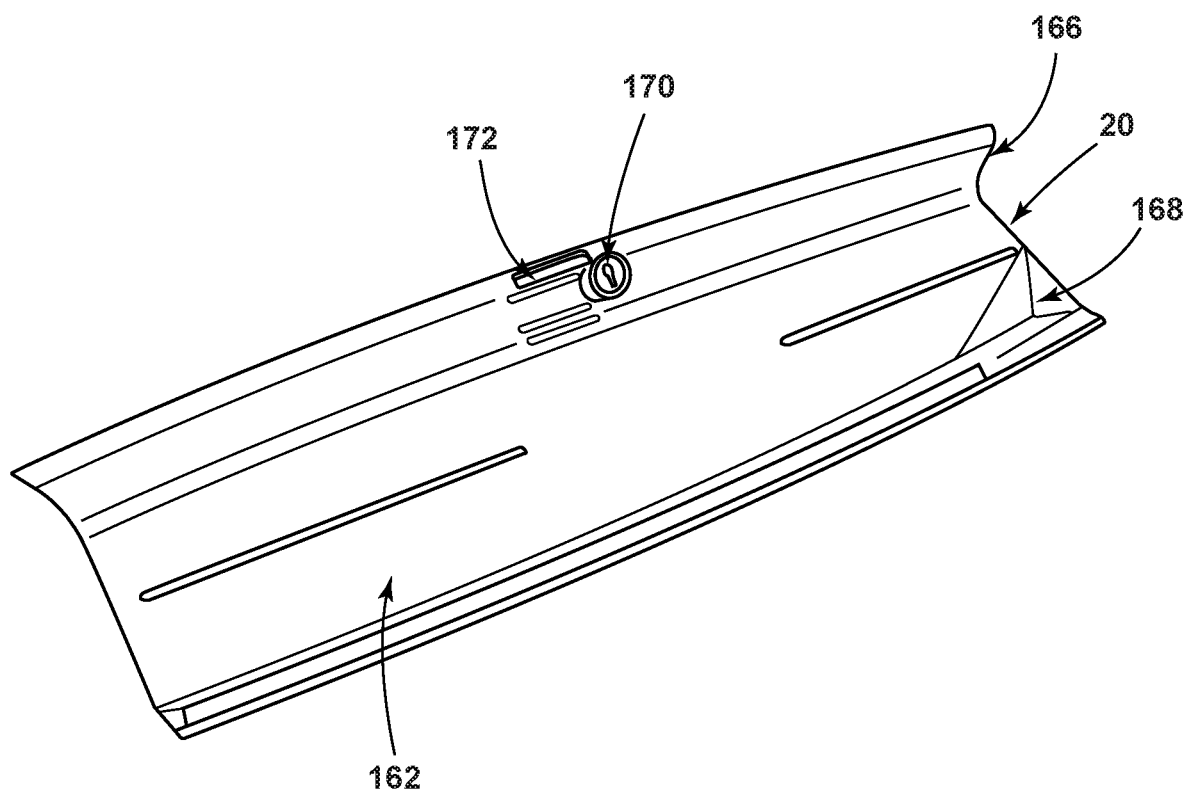
FIG. 6 is a perspective view of an exterior side of a panel that may be operably coupled with the vehicle, according to some examples.
Figure 7:
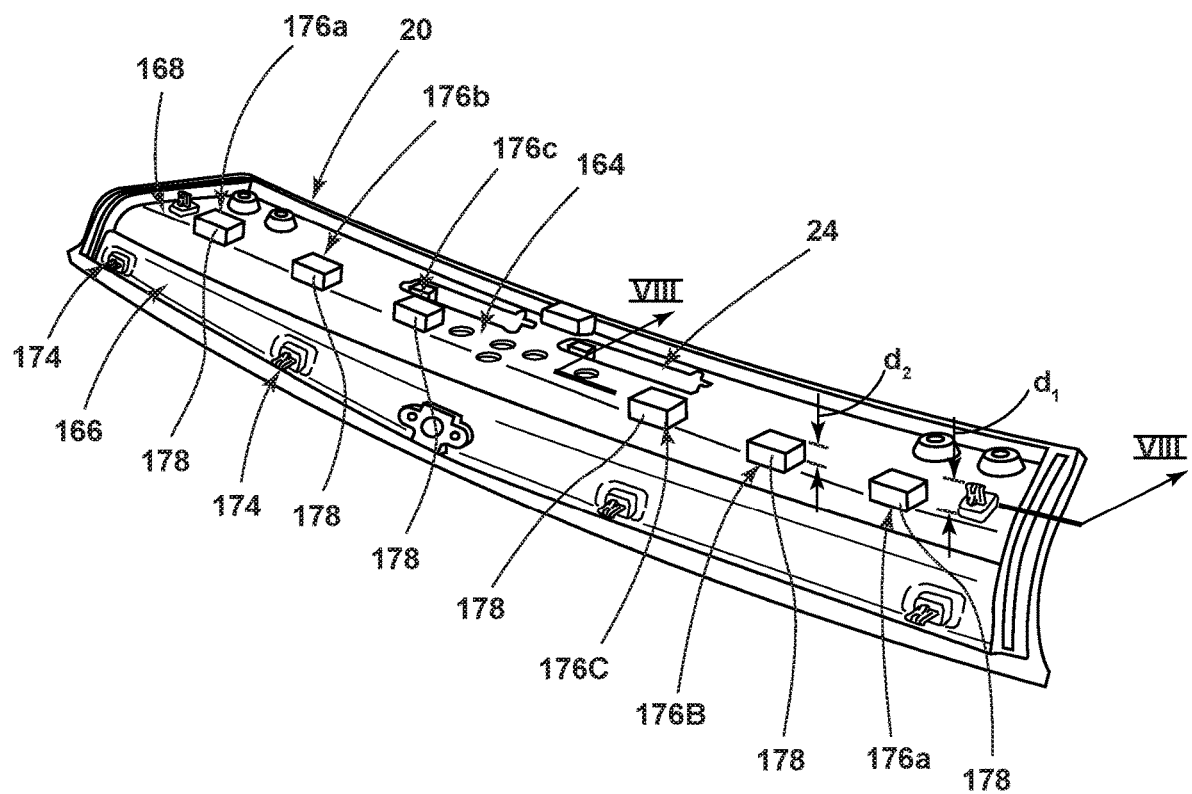
FIG. 7 is a perspective view of an interior side of a panel that may be operably coupled with the vehicle, according to some examples.

Referring to FIGS. 6 and 7, the first panel 20 may be disposed on a rear portion of the vehicle 10, as generally illustrated in FIGS. 1 and 2. However, in other examples, any panel 20 within and/or on the vehicle 10 may be manufactured in accordance with the teachings provided herein without departing from the scope of the present disclosure. In various examples, the first panel 20 may be a structural component of the vehicle 10, a decorative panel on the vehicle 10, a trim assembly, other exterior surface assemblies (collectively, "first panel") for vehicles (e.g., automobiles, watercraft, motorcycles, etc.) and other structures (e.g., architectural elements).

The first panel 20 includes an exterior surface 162 and an interior surface 164 (FIG. 2). In some aspects, the first panel 20, or the exterior surface 162 thereof, is characterized by an optical transmissivity of 85% or more over the visible spectrum (e.g., 390 to 700 nm). In some examples, the first panel 20 is characterized by an optical transmissivity of 90% or more, and possibly, 95% or more, over the visible spectrum. Further, the first panel 20 can be tinted (e.g., with one or more colors, smoke-like effects, or other gradations and intentional non-uniformities) and/or affixed with one or more filters on its exterior surface 162 and/or interior surface 164 to obtain a desired hue (e.g., black, blue, red, green, etc.) or other effect. In other examples, the first panel 20 can be optically clear with no substantial coloration.

Referring again to FIGS. 6 and 7, the first panel 20 may be fabricated from one or more substrates that may each be formed from a polymeric material. These polymeric materials include, but are not limited to, thermoplastic and thermosetting polymeric materials, e.g., silicones, acrylics, and polycarbonates. In some examples, the precursor material(s) employed to fabricate the first panel 20 are selected to have a high flow rate and/or a low viscosity during a molding process such as injection molding. In other examples, the precursor material(s) employed to fabricate the first panel 20 are selected with higher viscosity levels based on cost or other considerations when a less viscosity-dependent process is employed, such as insert molding. According to another example, ultraviolet light-resistant materials and/or treatments may be employed in the first panel 20 to enhance its resistance to ambient light-related degradation.

The first panel 20 can take on any of a variety of shapes, depending on the features of the first panel 20 and other design considerations. For example, in some examples, one or more of the exterior and interior surfaces 162, 164 of the first panel 20 are planar (e.g., faceted), non-planar, curved or characterized by other shapes. As also understood by those with ordinary skill in the field, the exterior and interior surfaces 162, 164 can be characterized with portions that have planar features and portions the have non-planar features.

As further illustrated in FIGS. 6 and 7, the first panel 20 may have a top portion 166 that is offset from a bottom portion 168. The top portion 166, or in other examples, the bottom portion 168, may include additional features coupled to the first panel 20. For example, an imager 170 may be disposed on the top portion 166 and oriented rearwardly of the vehicle 10 when the first panel 20 is installed on the vehicle 10. The top portion 166, or bottom portion 168, may also define one or more openings 172 for placement of other vehicle features therethrough. For example, the top portion 166 of the first panel 20 may include an opening 172 and a decklid latch handle may be disposed within the opening 172 when the first panel 20 is coupled to the vehicle 10.

With further reference to FIG. 7, the first panel 20 may be operably coupled and/or removably coupled with the second panel 22, and or any other portion of the vehicle 10. In some examples, the second panel 22 may include attachment points through which clips and/or retainers 174 on the first panel 20 may be inserted. The retainers 174 may be disposed on retainer towers of the first panel 20.

Referring still to FIG. 7, the lamp assembly 24 is further illustrated having three light projectors 176a, 176b, 176c for generating three different lighted interferences 182a, 182b, 182c (FIG. 8) upon activation of the respective light projectors on two opposing sides of the first panel 20. The light projectors may each include a housing 178 that may be operably coupled with or integrally formed with any portion of the first panel 20. Moreover, in some examples, the retainers 174 extend a distance $d_1$ rearward of the first panel 20 and the housings 178 extend a second distance $d_2$ rearward of the first panel 20. In some instances, the second distance $d_2$ is less than the first distance $d_1$.

Figure 8:
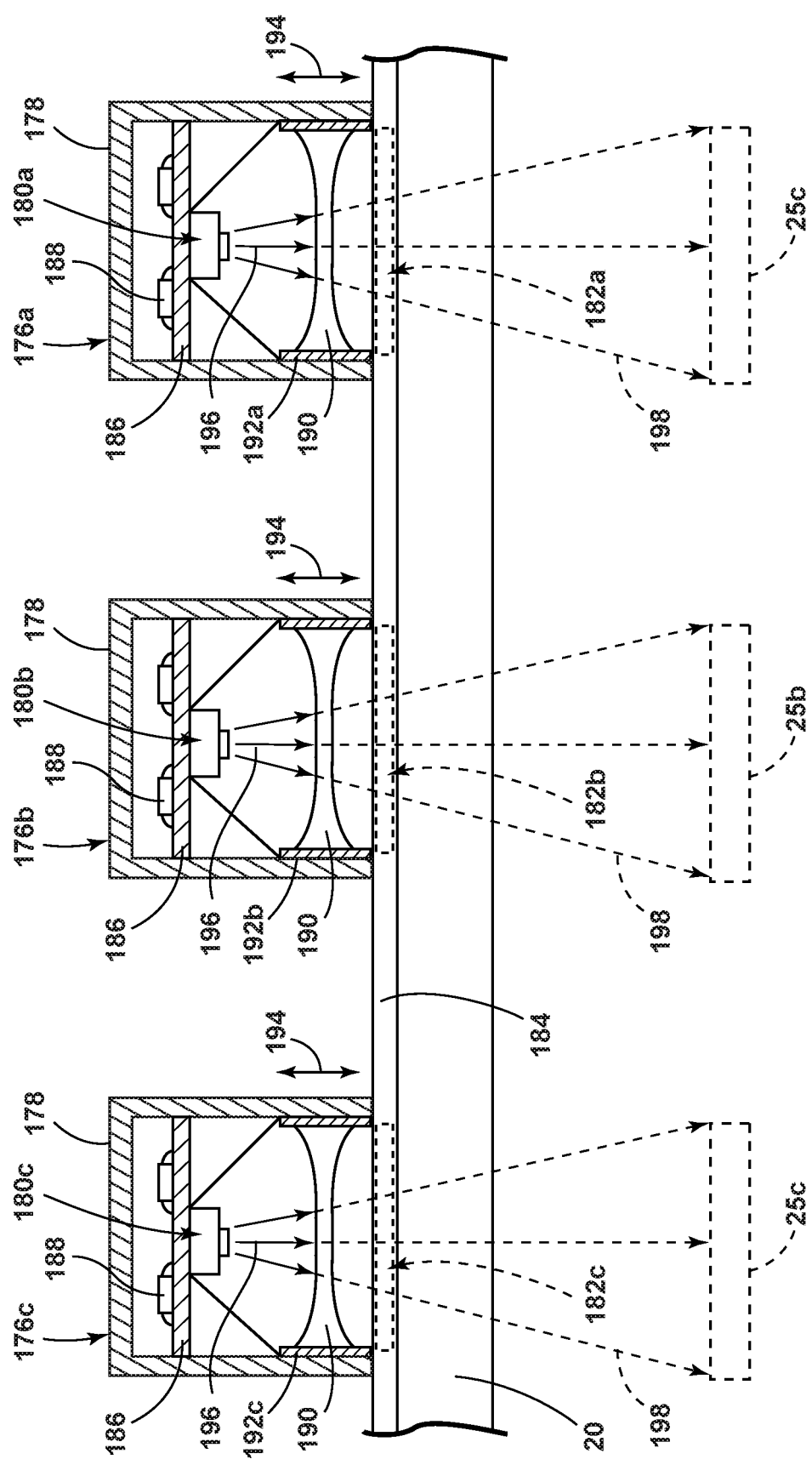
FIG. 8 is a cross-sectional view of the panel of FIG. 7 taken along the line VIII-VIII of FIG. 7.

Referring to FIG. 8, the lamp assembly 24 may include a first light projector 176a, a second light projector 176b and a third light projector 176c, all shown arranged in a linear array. Each of the light projectors includes a housing 178, a light source 180a, 180b, 180c, and is optically coupled with an image interference 182a, 182b, 182c. The image interferences 182a, 182b, 182c may be disposed on the first panel 20. Once the light projectors are coupled with the first panel 20, the image interferences 182a, 182b, 182c may be optically coupled with each respective light projector. The image interferences 182a, 182b, 182c may be disposed on a light transparent film 184 having either a positive or a negative light transparent image such that light output by the light sources 180a, 180b, 180c is illuminated onto and passes through the image interferences 182a, 182b, 182c one at a time to provide the images 25a, 25b, 25c. Alternatively, the image interferences 182a, 182b, 182c may be arranged within light output windows of the corresponding light sources 180a, 180b, 180c. Additionally, each light projector is shown having a printed circuit board 186 having control circuitry 188 including LED drive circuitry for controlling activation and deactivation of each respective light source 180a, 180b, 180c and hence the light projectors 176a, 176b, 176c.

The light sources 180a, 180b, 180c may include any form of light sources. For example, fluorescent lighting, light-emitting diodes (LEDs), organic LEDs (OLEDs), polymer LEDs (PLEDs), laser diodes, quantum dot LEDs (QD-LEDs), solid-state lighting, a hybrid of these or any other similar device, and/or any other form of lighting may be utilized in conjunction with the first panel 20. Further, various types of LEDs are suitable for use as the light sources 180a, 180b, 180c including, but not limited to, top-emitting LEDs, side-emitting LEDs, and others. Moreover, according to various examples, multicolored light sources 180a, 180b, 180c, such as Red, Green, and Blue (RGB) LEDs that employ red, green, and blue LED packaging may be used to generate various desired colors of light outputs from a single light source 180, according to known light color mixing techniques. According to some aspects, additional optics (not shown) can be placed between the light sources 180a, 180b, 180c and the first panel 20 to adjust, collimate, focus or otherwise shape the incident light that enters the first panel 20 from these sources. According to various examples, each projector may include more than one light source forming a single light source unit.

Referring still to FIG. 8, each projector 176a, 176b, 176c may include an optical member 190 that is optically coupled with the light source. The optical member 190 may be disposed within the housings 178 and/or may be integrally formed with the housings 178. Further, an inner wall 192a, 192b, 192c of each housing 178 may include tracks or rails over which the optical member 190 can travel back and forth in the direction of the arrow 194 shown in FIG. 8. It is understood that such travel or movability, in relation to the light sources 180a, 180b, 180c, is configured to vary the size of the image. Particularly, such movability enabled through the tracks or rails may allow focusing the image.

A light beam 196 emitted from the light sources 180a, 180b, 180c can be a monochromatic beam of light, such as a laser, and accordingly, the light beam 196 can be a laser beam, configured to deliver a specific wavelength of visible light. This wavelength establishes a laser's color, as seen by the eye, by emitting light in a single, narrow beam. Furthermore, the laser adopted in the lamp assembly 24 may be modulated for human viewing and application and may have no or negligible effects to those who may view the light. In other examples, any other type of light source may be utilized, including red, blue, and green packaged LEDs.

The optical member 190 may include interchangeable lenses and can be at least one of a concave lens, convex lens, cylindrical lens, or an impression or projection specific optical member, depending upon the usability and application. Optical members, such as the optical member 190, may enable one to attain images 25a, 25b, 25c, messages, curves, etc. In addition, the optical member 190 may include a Fresnel lens composed of a number of small lenses arranged to make a lightweight lens of large diameter and short focal length suitable to be employed for laser projections according to some examples of the present disclosure.

During an operation of the lamp assembly 24, the light sources 180a, 180b, 180c emit respective light beams 196. The light beams 196 reach the optical member 190. Subsequently, the optical member 190, receiving the light beam 196, refracts the beam 196, causing the beam to form refracted rays 198, while enabling the beam 196 to travel either in its original direction or deflect, all based according to the beam's angle of incidence on the optical member 190. The refracted rays 198 passing across the interference 182*a*, 182*b*, 182*c* causes the images 25*a*, 25*b*, 25*c* to be projected on and/or externally from the first panel 20, allowing the images 25*a*, 25*b*, 25*c* to be visually viewed by a viewer.

In some examples, the first light projector 176*a* illuminates light onto the first interference 182*a* to generate a first lighted image 25*a*, the second light projector 176*b* illuminates light onto the second interference 182*b* to generate a second lighted image 25*a*, and the third light projector 176*c* generates a beam of light onto the third interference 182*c* to generate a third lighted image 25*c*. It should be appreciated that the light projectors 176*a*, 176*b*, 176*c* may be activated and deactivated one at a time in a successive sequence at a rapid rate to generate animated imaging. In doing so, each light projector may be activated for an activation time period in the range of about 50 to 500 milliseconds, and in some instances, between 50 to 250 milliseconds, and then turned off and the next light projector may be turned on immediately so as to generate the appearance of a moving lighted image 25*a*, 25*b*, 25*c*, such as an animated running mustang. The activation time period could be extended up to 1.5 seconds, according to examples that generate a slower moving image 25*a*, 25*b*, 25*c*. With a sufficiently fast successive activation and deactivation of the light projectors, the mustang appears to be running, as the legs as viewed by a user appear to move. It will be appreciated that any other image 25*a*, 25*b*, 25*c*, static or dynamic, may be projected by the lamp assembly 24 without departing from the teachings of the present disclosure. Moreover, the projectors may independently illuminate and/or illuminate simultaneously for any desired effect without departing from the scope of the present disclosure.

With further reference to FIG. 8, the film 184 may be a holographic film that is positioned between the projectors and the first panel 20. Additionally or alternatively, the first panel 20 may define one or more holographic gratings. The holographic film 184 additionally and/or alternatively may define one or more holographic gratings. The holographic film 184 may be a polymeric film 184 having a plurality of features configured to form an interference 182*a*, 182*b*, 182*c*. The features of the holographic film 184 may be ridges, variations in opacity, density, or surface profile. The holographic film 184 may be composed of polyethylene terephthalate materials, orientated polypropylene materials, polyvinyl chloride materials, combinations thereof, and/or any other suitable material known in the art.

The holographic film 184 may be metalized or transparent. The holographic film 184 may have a density of between about 70 gsm and about 450 gsm. Light from the light sources 180*a*, 180*b*, 180*c* directed through the interference 182*a*, 182*b*, 182*c* diffracts into a light field, which forms the images 25*a*, 25*b*, 25*c*. The images 25*a*, 25*b*, 25*c* may also be known as a hologram. The light field, which forms the images 25*a*, 25*b*, 25*c*, may exhibit visual depth queues such as parallax and perspective that change realistically with any change in the relative position of the observer. As the images 25*a*, 25*b*, 25*c* exhibit a depth and changes with changing perspective of the observer, the images 25*a*, 25*b*, 25*c* are holograms. Some examples of the lamp assembly 24, which incorporate multiple light sources 180*a*, 180*b*, 180*c*, which may be advantageous in providing a uniform appearance to the projected images 25*a*, 25*b*, 25*c* regardless of viewing perspective of the observer.

The images 25*a*, 25*b*, 25*c* may change color with a change in the color of the light sources 180*a*, 180*b*, 180*c*. Further, the images 25*a*, 25*b*, 25*c* may appear different from different angles and examples utilizing differently oriented or differently colored light sources 180*a*, 180*b*, 180*c*. For example, the intensity or color of the projected image 25*a*, 25*b*, 25*c* may vary based on the observer's position in relation to the vehicle 10. The intensity of the images 25*a*, 25*b*, 25*c* may be increased or decreased by a corresponding increase or decrease in light from one or more of the light sources 180*a*, 180*b*, 180*c*. According to various examples, altering the activation of the light sources 180*a*, 180*b*, 180*c* may be configured to give the images 25*a*, 25*b*, 25*c* the appearance of movement, as provided herein. Based on the lighting from the light sources 180*a*, 180*b*, 180*c*, the images 25*a*, 25*b*, 25*c* may provide a 120° cone of image 25*a*, 25*b*, 25*c* stand off from the first panel 20 and/or the film 184. Moreover, as provided herein, the lamp assembly 24 may be activated in conjunction with a vehicle feature, such a boost mode. In response to activation of the boost mode, and consequently the lamp assembly 24, the images 25*a*, 25*b*, 25*c* may sequentially illuminate to provide notification to persons proximate the vehicle 10 of an activated feature of the vehicle 10.

Figure 9:
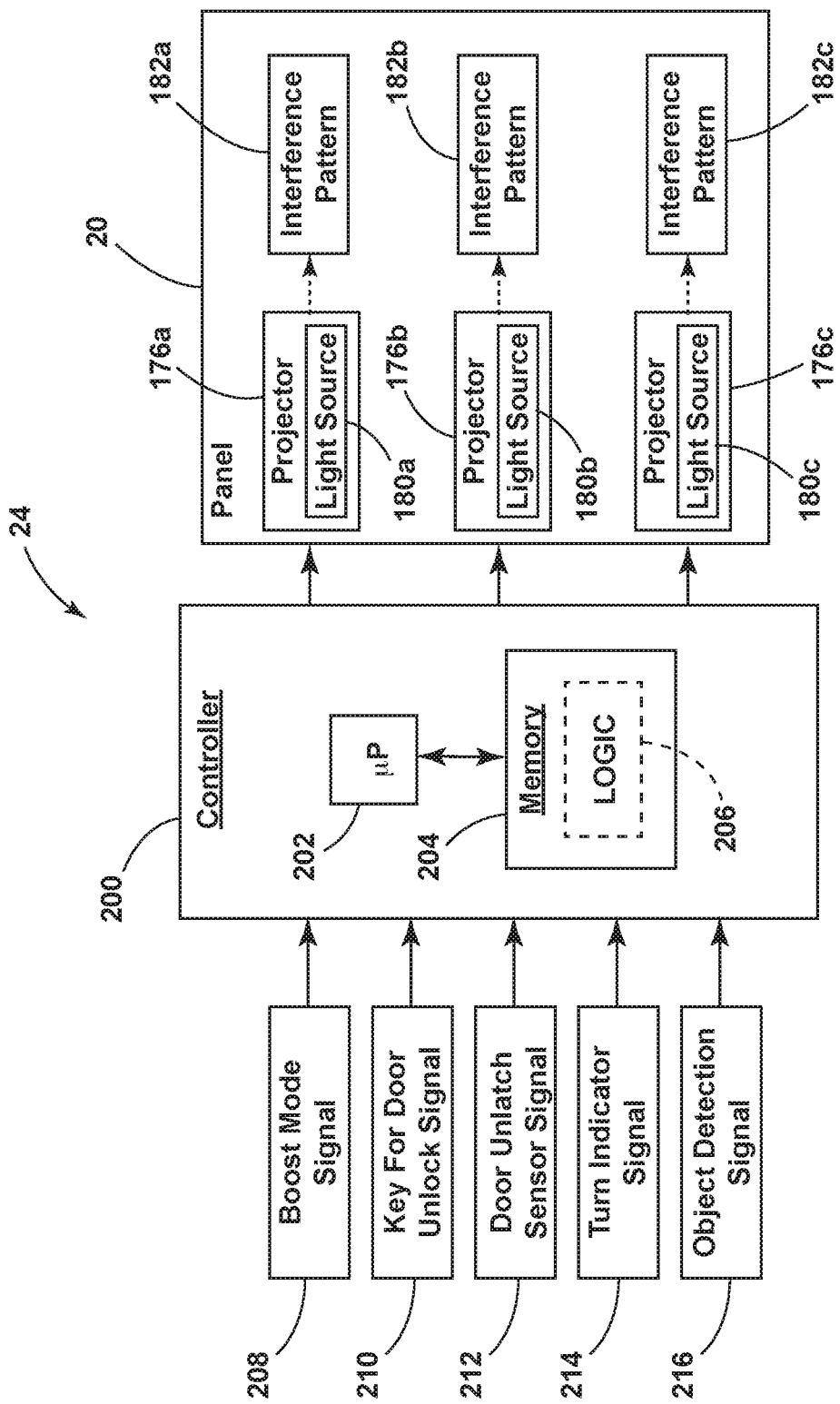
FIG. 9 is a block diagram illustrating the lamp assembly according to some examples.

Referring to FIG. 9, the lamp assembly 24 is illustrated having a controller 200 receiving various inputs and controlling each of the first, second and third projectors 176*a*, 176*b*, 176*c*, by applying signals to the light sources 180*a*, 180*b*, 180*c*. The controller 200 may include a microprocessor 202 and memory 204. It should be appreciated that the controller 200 may include control circuitry such as analog and/or digital control circuitry. Logic 206 is stored within memory 204 and executed by a microprocessor 202 for processing the various inputs and controlling each of the plurality of light projectors 176*a*, 176*b*, 176*c* as described herein. The inputs to the controller 200 may include activation of a vehicle feature, such as a boost mode. Additionally, a key fob door unlock signal 210, which may be made available from another controller, e.g., body control module, within the vehicle 10 in communication with the key fob via wireless communication. Additionally, the controller 200 further receives a door unlatch sensor signal 212.

The boost mode signal 208 or pre-boost mode signal may be activated when any of a variety of actions occur to increase boost while controlling engine speed. Further, the lamp assembly 24 may be activated when a pre-boost feature is activated that includes actions to optimize a subsequent vehicle launch. For example, each light projector 176*a*, 176*b*, 176*c* may be activated for an activation time period in the range of about 50 to 500 milliseconds, and in some instances, between 50 to 250 milliseconds, and then turned off and the next light projector may be turned on immediately so as to generate the appearance of a moving lighted image 25*a*, 25*b*, 25*c*, such as an animated running mustang.

The door unlatch sensor signal 212 may be a signal sensed by the proximity sensor in the door handle, or may be a signal detected by activation of a sensor on the key fob. Similarly, the controller 200 processes the inputs and activates the lamp assembly 24 when the key fob door unlock signal 210 is received, and in turn, may activate the plurality of light projectors sequentially on and off one at a time.

In some examples, the lamp assembly 24 may be activated in response to a turn indicator signal 214, which may be generated when a vehicle steering wheel is rotated and/or a vehicle turn signal indicator lever is activated. In response, one or more of the projectors may sequentially illuminate, possibly sequentially, to indicate a desired change in direction of the vehicle 10. Additionally and/or alternatively, one or more projectors may flash on a side to indicate the desired change in direction.

In some examples, the lamp assembly 24 may illuminate for a predetermined amount of time (e.g., thirty seconds or less) when a sensor on the vehicle 10 detects a moving object proximate the vehicle 10 for a predetermined amount of time (e.g., thirty minutes or less) after placing the vehicle 10 in a parked position thereby generating an object detection signal 216. The exterior sensors may include one or more imagers 170 or any other vision-based device. The imager 170 includes an image sensor having an area-type image sensor, such as a CCD or a CMOS image sensor and image-capturing optics (not shown), and captures an image of an imaging field of view defined by the image-capturing optics. In some instances, a first imager may be disposed on a front portion of the vehicle 10 and a second imager 170 may be located proximate a rear portion of the vehicle 10. The images 25a, 25b, 25c may be analyzed to determine if an object and/or person is approaching the vehicle 10. Likewise, the one or more exterior sensors may generate a detection field. The exterior sensor may additionally and/or alternatively be configured as an ultrasonic sensor, a radar sensor, a LIDAR sensor, or any other type of sensor known in the art.

In response to receiving an activation signal 208, 210, 212, 214, 216, the controller may activate one or more of the projectors. The projectors are optically coupled with various interferences 182a, 182b, 182c and generate various image 25a, 25b, 25c patterns on and/or rearwardly of the first panel 20.

Use of the present disclosure may offer a variety of advantages. For instance, use of the lamp assembly provided herein may generate perceived images externally from a panel of the vehicle. The images may be concealed when the lamp assembly is in a nonactivated state and be visible once the lamp assembly is activated. The lamp assembly may be activated for any desired reason, including upon activation of a vehicle feature, such as when a vehicle engine is utilized in a pre-boost or boost mode. The lamp assembly may include one or more projectors that illuminate sequentially to create a dynamic image that appears to move or otherwise be disposed in a non-stationary state. In other examples, the projected image may be stationary while the lamp assembly is activated. The lamp assembly provided herein may provide the benefits described herein while being manufactured at reduced costs when compared to various lamp assemblies currently available.

According to one aspect of the present disclosure, a lamp assembly is provided herein. The lamp assembly includes a panel operably coupled with one or more projectors. A light source is disposed within each of the one or more projectors. An optical member is disposed between each of the light sources and the panel. An image interference is disposed between the optical member and an exterior surface of the panel. Examples of the lamp assembly can include any one or a combination of the following features:

the panel is operably coupled with a decklid of a vehicle;
the one or more projectors each include a housing and the panel includes one or more retainers, the retainers extending further from the panel than the housing;
the light source is configured as a laser diode;
a film disposed between the one or more projectors and the panel, the image interference disposed on the film;
an image is visible when the one or more projectors are activated and the image is concealed when the one or more projectors are in an nonactivated state;
the one or more projectors includes first and second projectors that illuminate sequentially based on initiation of a vehicle feature;
one or more projectors are activated in conjunction with activation of an engine boost mode or pre-boost mode;
a controller turns one of the light projectors on for a time period in the range of 50 to 500 milliseconds;
a controller sequentially activating the one or more projectors to generate an animated lighted image; and/or
the film is a holographic film that forms one or more projected images appearing externally from the panel.

Moreover, a method of illuminating an image from a vehicle lamp assembly is provided herein. The method includes operably coupling a panel with one or more projectors. The method further includes positioning a light source within each of the one or more projectors. The method further includes disposing an optical member between each of the light sources and the panel. Lastly, the method includes activating each of the light sources.

According to another aspect of the present disclosure, a vehicle lamp assembly is provided herein. The vehicle lamp assembly includes a light source disposed within one or more projectors. An optical member is disposed between each of the light sources and a panel. An image interference is disposed on a holographic film and disposed between the optical member and an exterior surface of the panel. Examples of the vehicle lamp assembly can include any one or a combination of the following features:

the holographic film forms one or more projected images appearing externally from the panel;
the one or more projectors are activated in conjunction with activation of an engine boost mode or pre-boost mode;
the one or more projectors includes first and second projectors that illuminate sequentially in response an activation signal; and/or
a controller configured to accept one or more activation signals from various inputs of a vehicle.

According to yet another aspect of the present disclosure, a vehicle lamp assembly is provided herein. The vehicle lamp assembly includes a light source disposed within one or more projectors. An optical member is disposed between each of the light sources and a panel. A plurality of image interferences is disposed on a holographic film and disposed between each of the optical members and an exterior surface of the panel. A controller sequentially activates the one or more projectors to generate an animated lighted image. Examples of the vehicle lamp assembly can include any one or a combination of the following features:

the one or more projectors each include a housing and the panel includes one or more retainers, the retainers extending further from the panel than the housing;
the holographic film forms one or more projected images appearing externally from the panel; and/or
the one or more projectors are activated in conjunction with activation of an engine boost mode or pre-boost mode.

It will be understood by one having ordinary skill in the art that construction of the described invention and other components is not limited to any specific material. Other exemplary examples of the invention disclosed herein may be formed from a wide variety of materials unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A lamp assembly for a vehicle, comprising:
    a panel operably coupled with one or more projectors and one or more retainers;
    a light source disposed within each of the one or more projectors;
    an optical member disposed between each of the light sources and the panel; and
    an image interference disposed between the optical member and an exterior surface of the panel, wherein the one or more projectors each include a housing and the one or more retainers couple the panel to the vehicle, the one or more retainers extending further away from the panel than the housing extends away from the panel.

2. The lamp assembly of claim 1, wherein the panel is operably coupled with a decklid of the vehicle.

3. The lamp assembly of claim 1, wherein the light source is configured as a laser diode.

4. The lamp assembly of claim 1, further comprising:
    a film disposed between the one or more projectors and the panel, the image interference disposed on the film.

5. The lamp assembly of claim 4, wherein the film is a holographic film that forms one or more projected images appearing externally from the panel.

6. The lamp assembly of claim 1, wherein an image is visible when the one or more projectors are activated and the image is concealed when the one or more projectors are in an nonactivated state.

7. The lamp assembly of claim 1, wherein the one or more projectors includes first and second projectors that illuminate sequentially based on initiation of a vehicle feature.

8. The lamp assembly of claim 7, wherein a controller turns one of the light projectors on for a time period in the range of 50 to 500 milliseconds.

9. The lamp assembly of claim 1, wherein one or more projectors are activated in conjunction with activation of an engine boost mode or pre-boost mode.

10. The lamp assembly of claim 1, further comprising:
    a controller sequentially activating the one or more projectors to generate an animated lighted image.

11. A vehicle, comprising:
    a vehicle system operable to output at least one of a boost mode signal and a pre-boost mode signal in conjunction with activation of at least one of an engine boost mode of the vehicle and a pre-boost mode of the vehicle;
    a lamp assembly, comprising:
        a light source disposed within one or more projectors;
        an optical member disposed between each of the light sources and a panel; and
        an image interference disposed on a holographic film and disposed between the optical member and an exterior surface of the panel; and
    a controller configured to activate the one or more projectors in response to at least one of the boost mode signal and the pre-boost mode signal.

12. The vehicle of claim 11, wherein the holographic film forms one or more projected images appearing externally from the panel.

13. The vehicle of claim 11, wherein the one or more projectors includes first and second projectors, and the controller is configured to activate the first and second projectors sequentially in response to activation of at least one of the engine boost mode and the pre-boost mode.

14. A vehicle, comprising:
a vehicle system operable to output an activation signal;
a lamp assembly, comprising:
- a plurality of projectors;
- one or more light sources disposed within each of the plurality of projectors;
- one or more optical members disposed between a panel and each of the one or more light sources; and
- a plurality of image interferences disposed on a holographic film and disposed between an exterior surface of the panel and each of the one or more optical members; and a controller configured to activate each of the plurality of projectors successively in a predetermined sequence in response to the activation signal to generate an animated lighted image.

15. The vehicle of claim 14, wherein the one or more projectors each include a housing and the panel includes one or more retainers, the retainers extending further from the panel than the housing.

16. The vehicle of claim 14, wherein the holographic film forms one or more projected images appearing externally from the panel.

17. The vehicle of claim 14, wherein the one or more projectors are activated in conjunction with activation of an engine boost mode or pre-boost mode.

* * * * *